United States Patent [19]

Guerriero

[11] 3,904,219

[45] Sept. 9, 1975

[54] VEHICLE SUSPENSION BUMPER

[75] Inventor: Charles P. Guerriero, Dearborn Heights, Mich.

[73] Assignee: Ford Motor Company, Dearborn, Mich.

[22] Filed: Oct. 4, 1974

[21] Appl. No.: 512,389

[52] U.S. Cl............ 280/124 R; 267/63 R; 267/140; 293/67
[51] Int. Cl.²................ B60G 11/24; B60G 11/40
[58] Field of Search............ 280/124 R; 267/21, 63, 267/140, 141; 293/71 R, 67, 63

[56] References Cited
UNITED STATES PATENTS

| | | | |
|---|---|---|---|
| 2,659,595 | 11/1953 | Coda | 267/63 R X |
| 3,669,467 | 6/1972 | Dunlap | 267/21 R |
| 3,770,077 | 11/1973 | Johnson | 267/140 |

*Primary Examiner*—Philip Goodman
*Attorney, Agent, or Firm*—Clifford L. Sadler; Keith L. Zerschling

[57] ABSTRACT

The present disclosure relates to a bumper for a vehicle suspension that is constructed to resiliently arrest extreme jounce deflection of a motor vehicle suspension system. The bumper, in its preferred embodiment, includes a bracket having a pair of side walls and a horizontal top wall. The bracket is welded to the vehicle's axle and its side walls pivotally support the end of a suspension link. The top wall has a pair of slots and a normally flat resilient piece has its ends extending inwardly through the slots. The resilient piece is supported in a broad arcuate shape. Upon extreme jounce deflection of the suspension, the resilient element engages a vehicle frame member or other support element and resiliently arrests the jounce movement of the unsprung suspension components.

7 Claims, 5 Drawing Figures

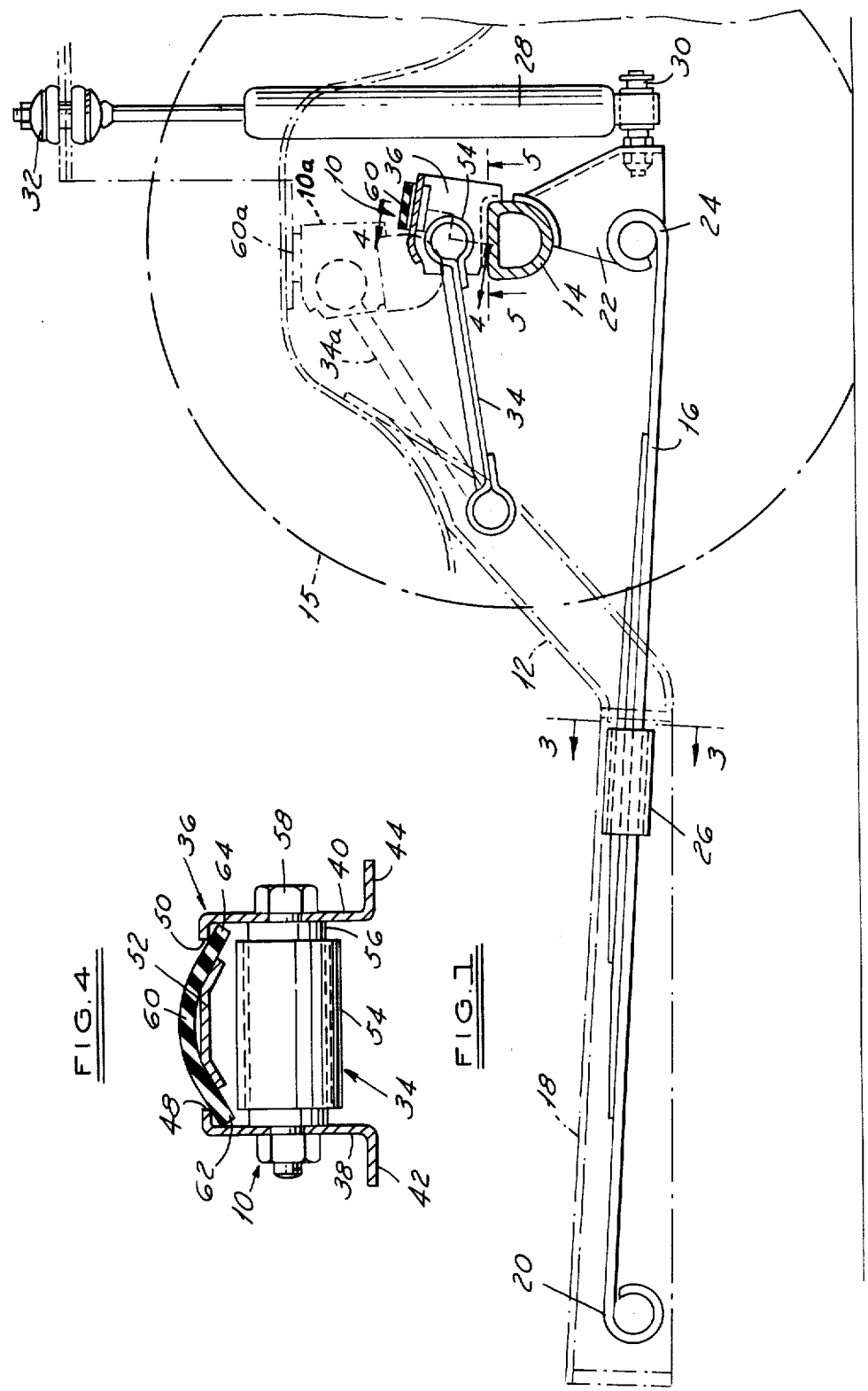

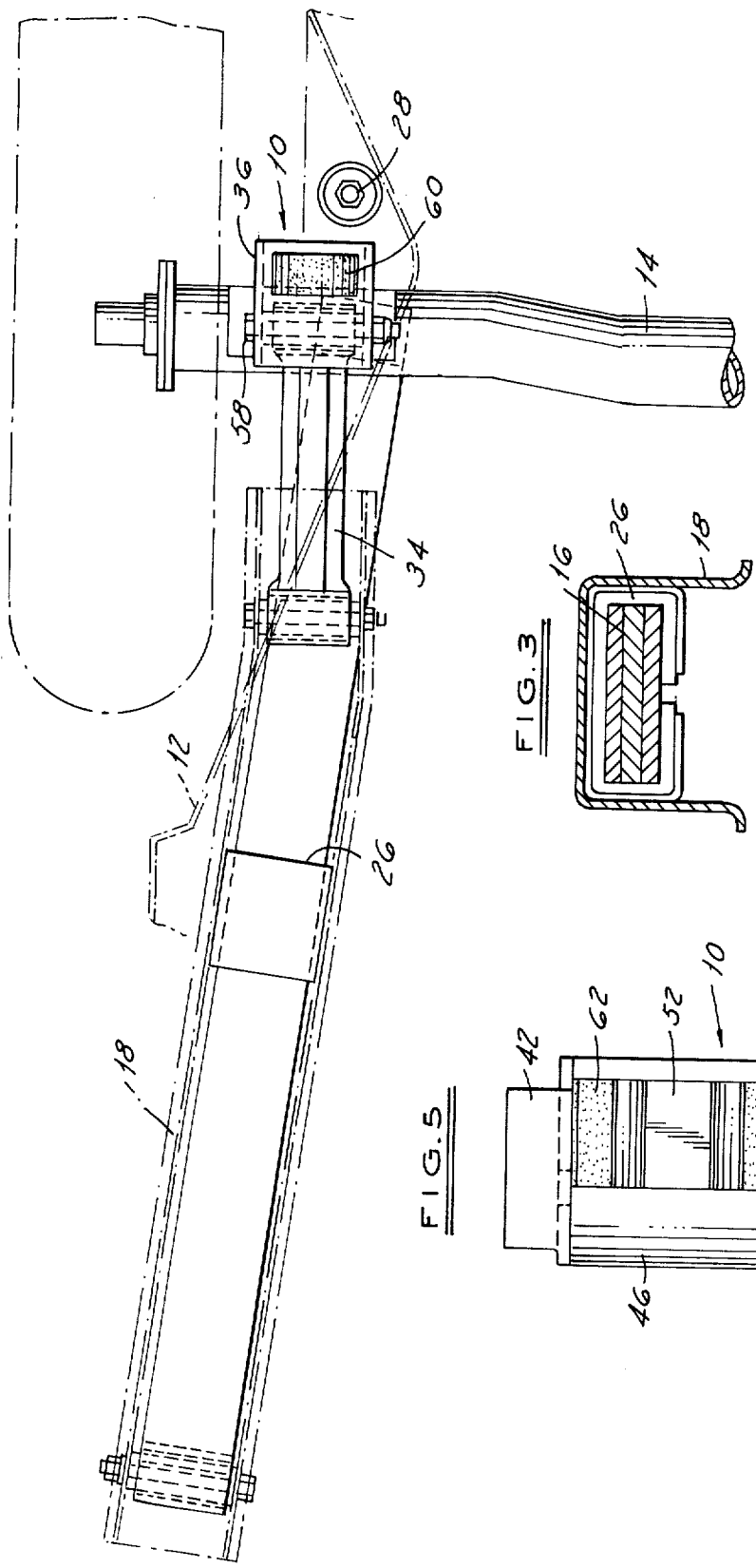

3,904,219

VEHICLE SUSPENSION BUMPER

BACKGROUND AND SUMMARY OF THE DISCLOSURE

The present invention relates to bumpers for motor vehicle suspension systems that are constructed to resiliently limit extreme jounce deflection of an axle housing. The principal object of the invention is to provide an inexpensive light-weight bumper that is easy to service and maintain.

In the presently preferred embodiment of the invention, a vehicle suspension has an axle housing to which a box-shape bracket is welded. The end of a suspension link is pivotally connected to the side walls of the bracket. The top wall of the bracket has a pair of slots that are spaced inwardly of the bracket's side walls. A normally flat resilient piece has its end portions extending inwardly through the slots in the top wall and into engagement with the opposing inner surfaces of the side walls. The mid-portion of the resilient piece is supported by the mid-portion of the horizontal or top wall. The normally flat resilient piece has a broad arcuate shape when retained by the bracket.

The resilient piece is constructed to engage a vehicle frame member or similar chassis component upon extreme jounce deflection of the axle. It resilient arrests the jounce movement of the unsprung suspension components.

The bumper of this invention is particularly characterized by its simplicity of construction and its economy of manufacture. The flat resilient piece may be of laminated construction similar to the side wall of a vehicle tire. If the bumper needs to be serviced, the resilient piece may be replaced easily without the need for special tools.

BRIEF DESCRIPTION OF THE DRAWINGS

The many objects and advantages of a suspension bumper constructed in accordance with this invention will become apparent upon consideration of the following detailed discussion and the accompanying drawings, in which:

FIG. 1 is a side elevational view of a motor vehicle suspension having a jounce bumper constructed in accordance with the invention.

FIG. 2 is a top plan view of the right-hand portion of the suspension of FIG. 1. FIG. 3 is a sectional view of the spring support taken along section line 3—3 of FIG. 1.

FIG. 4 is a sectional view of the bumper taken along section line 4—4 of FIG. 1.

FIG. 5 is a bottom plan view of the bumper taken in the direction of arrows 5—5 of FIG. 1 with the suspension arm and pivot bushing removed to better illustrate the construction of the bracket and resilient piece.

DETAILED DESCRIPTION OF PRESENTLY PREFERRED EMBODIMENT

Referring now to the drawings, wherein the presently preferred embodiment of the invention is illustrated, FIG. 1 discloses a suspension system for a motor vehicle having a jounce bumper assembly 10. The suspension system and related vehicle structure includes a frame assembly 12, an axle 14 and a suspension spring 16 that interconnects the axle and frame. Left and right road wheels 15 are rotatably supported by the axle 14.

The frame assembly 12 includes a channel-shape rail member 18. The forward end of the spring 16 is provided with an eye 20 that is secured to the rail 18. A depending bracket 22 is welded to the axle 14. The rearward end of the spring 16 is provided with an eye 24 which is pivotally connected to the bracket 22. The forward half of the spring 16 is positioned within the channel-shape portion 18 of the frame 12. A mid-portion of the spring 16 is enclosed by a spring support 26 that normally engages the side walls and top wall of the channel-shape frame member 18 as shown in FIG. 3.

A telescopic shock absorber 28 has its lower end connected to the bracket 22 by a cantilever pin 30. The upper end of the shock absorber 28 is pivotally connected to the frame 12 by a resilient bayonet type mounting 32.

An upper suspension arm 34 has its forward end pivotally connected to the frame 12 and its rearward end pivotally connected to the bumper assembly 10.

According to the present invention, the bumper assembly 10 provides a means for pivotally supporting a suspension arm and for resiliently resisting extreme jounce deflection of the axle 14. The bumper assembly 10 includes a box-shape bracket 36 having side walls 38 and 40. The lower ends of the side walls 38 and 40 terminate in outwardly extending flanges 42 and 44 that are welded to the axle 14. The upper ends of the side walls 38 and 40 are interconnected by a horizontal wall 46 which has a pair of slots 48 and 50 stamped therein. Top wall 46 has a mid-portion 52 with edges adjacent the slots 48 and 50 that are turned inwardly as seen in FIG. 4.

The rearward end of the suspension arm 34 is provided with an eye 54 and a resilient bushing 56 is disposed within the eye. A bolt 58 extends through the bushing 56 and connects the bushing to the side walls 38 and 40 of the bracket 36.

A normally flat resilient piece 60 has its ends portions 62 and 64 extending through the slots 48 and 50 and into engagement with the opposed inner surfaces of the side walls 38 and 40. The mid-portion of the resilient piece 60 is supported by the mid-portion 52 of the horizontal wall 46 in the bracket 36. The resilient piece 60 may be formed of a laminated rubber having a fabric reinforcement.

OPERATION

The bumper assembly 10 is constructed to perform the dual function of pivotally supporting the end of the suspension arm 38 and of resiliently limiting extreme jounce reflection of the axle 14. FIG. 1 discloses the suspension components at their normal riding position. The extreme jounce position of the suspension arm 34 and bracket 10 are shown by dotted lines in FIG. 1 and indicated by reference numerals 34a and 10a, respectively. The resilient element 60 is shown in its jounce position 60a where it engages a reinforced panel of the frame assembly 12. The middle of the resilient element 60 engages the frame 12 and is deflected and compressed thereby. Such action resiliently arrests extreme jounce deflection of the axle housing 14.

The bumper assembly 10, while performing the dual function of pivotally supporting a suspension arm and resiliently arresting extreme jounce deflection, is particularly characterized by its simplicity of construction. It is intended that the resilient piece 60 be fabricated from flat laminated rubber stock. It need not be an expensive molded piece but instead may be cut from flat material. A new piece 60 can be easily installed when necessary and in an emergency a replacement piece could be cut from a tire carcass.

The foregoing description presents the presently preferred embodiment of this invention. Details of construction have been presented for purposes of illustration and are not to be considered limits of the invention. Modifications and alterations may occur to those skilled in the art that will come within the scope and spirit of the following claims.

I claim:

1. A vehicle suspension bumper comprising a bracket constructed to be connected to a first suspension component, said bracket having a pair of side walls and an interconnecting wall connecting said side walls, said interconnecting wall having a mid-portion and a pair of end portions, said interconnecting wall having a pair of slots with one of said slots being situated between one of said end portions and said mid-portion and the other of said slots being situated between the other of said end portions and said mid-portion, a resilient element having a mid-portion and a pair of end portions, said resilient element being constructed to engage a second suspension component, said resilient element extending through said slots with its mid-portion disposed outwardly of said mid-portion of said interconnecting wall and its end portions disposed inwardly of said end portions of said interconnecting wall.

2. A vehicle suspension bumper according to claim 1 and including:

said resilient element being normally flat in its free state and being constrained to a generally arcuate shape by its engagement with said bracket.

3. A vehicle suspension bumper according to claim 1 and including:

said resilient element being normally flat in its free state and being constrained to a generally arcuate shape by its engagement with said bracket, said mid-portion of said resilient element being normally spaced apart from said mid-portion of said interconnecting wall.

4. A vehicle suspension bumper according to claim 1 and including:

said resilient element being normally flat in its free state and being constrained to a generally arcuate shape by its engagement with said bracket, said mid-portion of said resilient element being normally spaced apart from said mid-portion of said interconnecting wall, said resilient element being fabricated from a fabric reinforced rubber material.

5. A vehicle suspension system having sprung and unsprung suspension components, a generally box-shape bracket connected to one of said suspension components, said bracket having a pair of side walls and an interconnecting wall extending between said side walls, a wheel positioning member operatively interposed between said suspension components, said wheel positioning member having a mounting eye, pivot means extending through said eye and pivotally connecting said wheel positioning member to said pair of side walls, said interconnecting wall having a pair of slots spaced inwardly of said side walls, a normally flat resilient element having a mid-portion situated outwardly of said interconnecting wall, said resilient element having end portions extending inwardly through said slots, said resilient element being constrained to a generally arcuate shape by its engagement with said bracket.

6. A vehicle suspension system according to claim 5 and including:

the ends of said resilient element engaging the opposed inner surfaces of said side walls.

7. A vehicle suspension bumper according to claim 5 and including:

said mid-portion of said resilient element being normally spaced apart from said interconnecting wall.

* * * * *